United States Patent Office 3,555,815
Patented Jan. 19, 1971

3,555,815
SPEED CONTROL APPARATUS FOR
GAS TURBINE ENGINES
Joseph Lewis Bloom, Baie d'Urfe, Quebec, Canada, assignor to Joseph Lucas (Industries) Limited, Birmingham, England
Filed July 22, 1968, Ser. No. 746,483
Int. Cl. F02c 9/08
U.S. Cl. 60—39.28                 5 Claims

ABSTRACT OF THE DISCLOSURE

Apparatus for controlling the supply of fuel to a gas turbine engine including means for controlling a spring acting against a governor lever, with the spring acting against a lever which is fulcrummed against a cam which is manually operable and the lever being fulcrummed on a part whereby the setting of the spring can be varied to vary the speed at which the engine is governed.

BACKGROUND OF THE INVENTION

This invention relates to apparatus for controlling the speed of a gas turbine engine having a governor, and of the kind comprising valve means for controlling the flow of fuel to the engine, speed responsive means for actuating the valve means, a spring against which the speed responsive means reacts to determine the speed at which governing is effected, and manually operable means for varying the action of the spring to vary the speed of governing.

When a plurality of gas turbine engines, each incorporating such apparatus are to be used together such, for example as in an aircraft, difficulty is often encountered in adjusting the various apparatus so that the engines are correctly matched for speed when the plurality of manually operable means occupy the equivalent positions, as is desirable.

The object of the present invention is to provide apparatus whereby this difficulty can be overcome in a convenient manner.

SUMMARY OF THE INVENTION

According to the invention apparatus of the kind specified is characterized in that the action of the spring is variable by means of a lever, against which bears a movable member forming part of the manually operable means, the lever being fulcrummed on a part which can be adjusted to vary the action of the spring for any given setting of said member.

BRIEF DESCRIPTION OF THE DRAWINGS

An example of the invention will not be described with particular reference to the accompanying drawings in which.

DETAILED DESCRIPTION OF THE INVENTION

Figure 1:
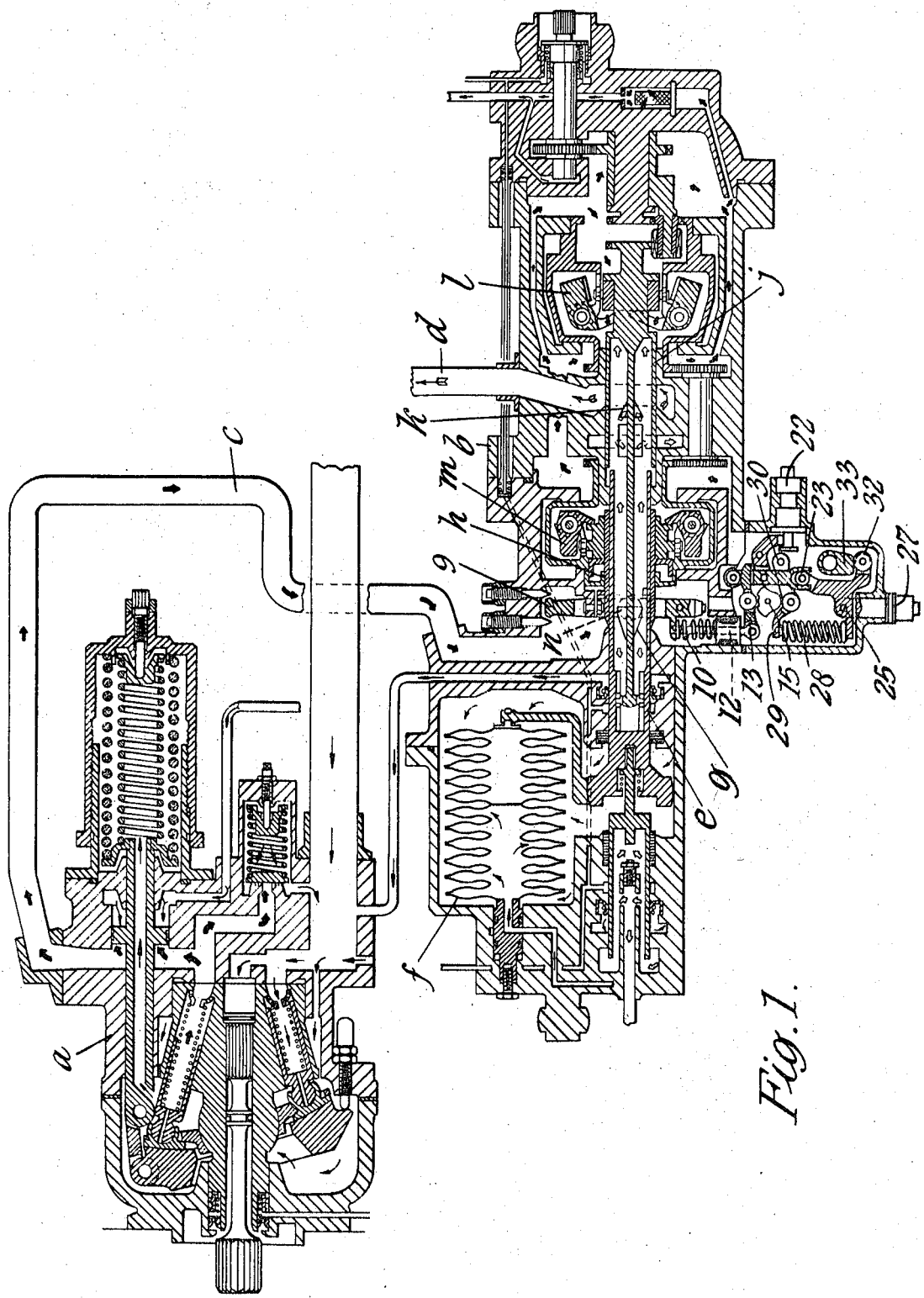
FIG. 1 is a diagrammatic view of a gas turbine engine fuel control apparatus incorporating this invention.
Figure 2:
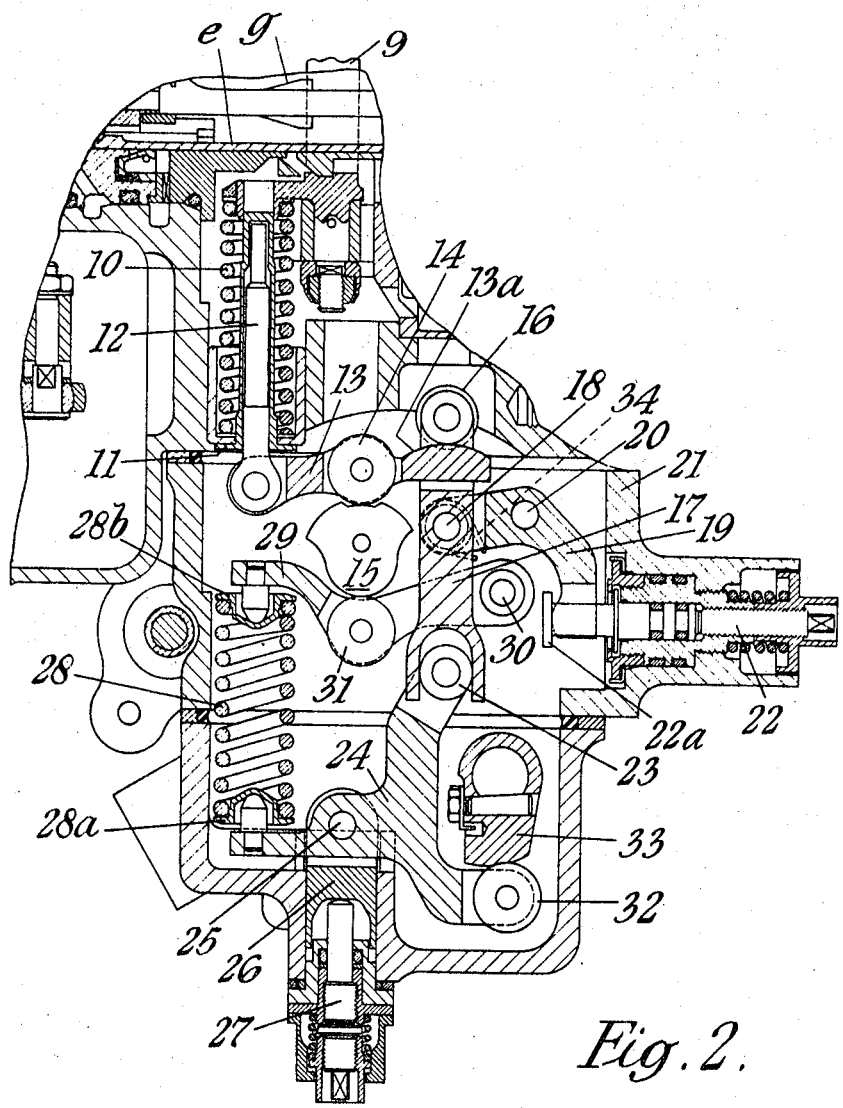
FIG. 2 is an enlarged view of that part of the apparatus which embodies the invention.

In the example illustrated, the apparatus comprises an engine driven pump $a$ arranged to supply fuel to the engine through a body $b$. The drawing shows a passage $c$ from the pump $a$ to the body $b$ and an outlet passage $d$ from the body leading to the engine. The body contains an inner tube $e$ axially slidable in the body under the control of a capsule assembly $f$ which is sensitive to the pressure conditions existing in the engine compressor stage. In this inner tube $e$ is a set of triangular orifices $g$ through which fuel can enter the interior of the tube $e$. There is a sleeve $h$ surrounding the inner tube $e$ and axially movable relatively thereto. The relative axial positions of the tube $e$ and the sleeve $h$ determine the flow of fuel into the interior of the tube. A further tube $j$ mounted co-axially with the tube $e$ and sleeve $h$ has orifices $k$ which determine the rate of flow of fuel reaching the outlet passage $d$.

The position of the tube $j$ is determined by a set of engine driven weights $l$. The position of the sleeve $h$ is moreover determined by a further set of weight $m$ which are also engine driven. The effect of the weights $m$ upon the sleeve $h$ is, however, modified by a spring 10 acting upon a yoke member 9 which is pivotally connected to the sleeve $h$ at $n$. This mechanism controls the governed speed of the engine.

The spring 10 reacts on an adjustable abutment 11 surrounding a spindle 12 pivotally connected to one end of a lever 13. Intermediate the ends of the lever 13 is a roller 14 which bears, under the action of the spring 10 against a cam 15 which is angularly adjustable under the manual control of the pilot through any convenient means (not shown). The end of the lever 13 remote from the spindle 12 has an arcuate surface 13a bearing against a roller 16 constituting a fulcrum for the lever 13.

The roller 16 is carried by one end of a lever 17 which is pivotally mounted intermediate its ends at 18 on one arm of a bellcrank lever 19. The bellcrank lever 19 is pivotally mounted at 20 on a relatively fixed body 21 secured to the body $b$, and can be angularly adjusted by a screw 22 engaging in the body 21, the screw 22 having a head 22a abutting against the other arm of the lever 19.

The arc of curvature of the surface 13a has a radius equal to the distance between the axes of the pivot 18 and the roller 16, less the effective radius of the roller 16, so that in the position shown (i.e. the idling position) angular movement of the lever 17 will not vary the setting of the lever 13.

The end of the lever 17 remote from the roller 16 is bifurcated to embrace a roller 23 carried by one arm of a three armed lever 24 pivotally mounted at 25 on a fulcrum piece 26 which is adjustable by a screw 27 engaging the body 21.

A second arm of the lever 24 bears, through an abutment piece 28a, on one end of a coiled compression spring 28, the other end of which bears through another abutment piece 28b on one end of a lever 29. The lever 29 is pivotally mounted at its other end on a fixed pivot 30 on the body 21, and carries intermediate its ends a roller 31 bearing on the cam 15 at a point diametrically opposite the roller 14.

The third arm of the lever 24 carries a roller 32 which bears against an angularly adjustable cam 33 operable by the pilot. Alternatively the position of this cam may be controlled by any other external control such as a jet pipe temperature control.

In order to minimize the effect of backlash between the roller 23 and the bifurcations of the lever 17, the latter is loaded in one angular direction by means of a torsion spring 34 coiled about the pivot 18.

The cam 15 is shown in the idling position in which the roller 14 is located in a dwell and a pilot operable lever will be in a mid-way position. Moreover, the cam 15 is so shaped that angular movement in either direction from the position shown will raise the lever 13 to compress the spring 10 by the same amount, at the end of its permitted movement, thereby increasing the governed speed of the engine to a predetermined extent. This is necessary to provide for the controlling of the engines in both forward and reverse thrust positions. Furthermore, the cam 15 is so shaped that as the lever 13 is raised to compress the spring 10, the lever 29 will rise also to relax the spring 28, and thereby maintain a substantially constant resistance to angular movement of the pilot's operating lever.

The idling speed of the engine can be adjusted by means of the screw 22, actuation of which causes raising or lowering of the lever 17, and thereby angular movement of the lever 13. This adjustment is effected with the cam 15 in the position shown. In order to adjust the maximum speed of the engine, the cam 15 is moved angularly to engage its point of maximum lift with the roller 14, and the screw 27 is then adjusted. The effect of adjusting the screw 27 is to rock the lever 24 and thereby move the lever 17 angularly to change the lever ratio of the lever 13. Due to the curvature of the surface 13a such angular movement of the lever 17, although initially moving the lever 13 angularly, will not upset the idling setting when the cam is returned to the position shown. If, after correctly setting the apparatus for idling and maximum speed, the idling setting should for any reason require to be changed, then this can be effected by means of the screw 22 without re-adjustment of the maximum speed setting, since the position of the pivot 20 is chosen so that the lift imparted to the lever 17 will be accompanied by a small angular movement of this lever to correct the maximum speed setting to the new idling setting.

The purpose of the pilot operable cam 33 is to provide excess fuel for aircraft take off. Movement of the cam 33 will also serve to move the levers 24 and 17 angularly and thereby provide a predetermined excess fueling throughout the speed range above idling dependent on the setting of the screw 27.

Having thus described my invention what I claim as new and desire to secure by Letters Patents is:

1. Apparatus for controlling the speed of a gas turbine engine comprising valve means for controlling fuel flow to the engine, speed responsive means for actuating the valve means, a spring against which the speed responsive means reacts to determine the speed at which governing is effected, and manually operable means for varying the action of the spring to vary the speed of governing, a lever for varying the action of the spring, a movable member forming part of the manually operable means and bearing against the lever, and an adjustable part on which the lever is fulcrumed whereby adjustment of the part varies the action of the spring for any setting of the member.

2. Apparatus as claimed in claim 1 in which the movable member is a cam forming part of the manually operable means.

3. Apparatus for controlling the speed of a gas turbine engine comprising valve means for controlling fuel flow to the engine, speed responsive means for actuating the valve means, a spring against which the speed responsive means reacts to determine the speed at which governing is effected, manually operable means for varying the action of the spring to vary the speed of governing, a lever for varying the action of the spring, a movable member forming part of the manually operable means and bearing against the lever, an adjustable part on which the lever is fulcrumed whereby adjustment of the part varies the action of the spring for any setting of the member, a roller on said adjustable part, said lever having a surface portion acting on said roller on said part to serve as the fulcrum for the lever, and means for adjustment of the position of said roller.

4. Apparatus as claimed in claim 3 in which the means for adjusting the fulcrum includes a manually controllable member.

5. Apparatus as claimed in claim 2 in which the cam also has acting thereagainst a further lever, a spring loading the further lever, and the shape of the cam being such that as the load applied to the spring changes, the spring loading of the further lever also changes to maintain substantially constant resistance to rotation of the cam.

References Cited

UNITED STATES PATENTS

| | | | |
|---|---|---|---|
| 2,533,231 | 12/1950 | Drake | 137—34 |
| 2,561,588 | 7/1951 | Muzzey | 137—34 |
| 2,602,654 | 7/1952 | Parker | 137—34 |
| 2,675,220 | 4/1954 | Feilden | 137—34 |
| 2,965,115 | 12/1960 | Stivender | 137—34 |
| 3,382,674 | 5/1968 | Bloom | 73—543 |

CLARENCE R. GORDON, Primary Examiner

U.S. Cl. X.R.

73—543